United States Patent
Mai (10) Patent No.: US 12,413,377 B2
(45) Date of Patent: Sep. 9, 2025

(54) LINE DRIVER CIRCUIT FOR FULL-DUPLEX TRANSCEIVERS WITH SUPPORT FOR DIFFERENTIAL AND SINGLE-ENDED SIGNALING

(71) Applicant: Aeonsemi, Inc., Grand Cayman (KY)

(72) Inventor: Tao Mai, Santa Clara, CA (US)

(73) Assignee: Aeonsemi, Inc., Grand Cayman (KY)

( * ) Notice: Subject to any disclaimer, the term of this patent is extended or adjusted under 35 U.S.C. 154(b) by 104 days.

(21) Appl. No.: 18/522,665

(22) Filed: Nov. 29, 2023

(65) Prior Publication Data

US 2025/0175315 A1      May 29, 2025

(51) Int. Cl.
    *H04L 5/14*       (2006.01)
    *H04L 25/02*      (2006.01)

(52) U.S. Cl.
    CPC ........ *H04L 5/1423* (2013.01); *H04L 25/0272* (2013.01)

(58) Field of Classification Search
    CPC ............... H04L 5/1423; H04L 25/0272; H04L 2012/6491; H04B 7/015; H04B 3/142; H04B 3/23
    See application file for complete search history.

(56) References Cited

U.S. PATENT DOCUMENTS

| | | | | |
|---|---|---|---|---|
| 6,618,480 B1* | 9/2003 | Polley | ....................... | H04B 3/23 379/406.05 |
| 6,813,311 B1* | 11/2004 | Pal | ........................... | H04B 3/23 379/406.01 |
| 7,333,603 B1* | 2/2008 | Sallaway | ............... | H04M 9/082 379/391 |
| 7,813,495 B1* | 10/2010 | Ziazadeh | ............... | H04B 3/235 379/398 |
| 11,405,044 B2* | 8/2022 | Wang | ...................... | H03M 1/682 |
| 2001/0016021 A1* | 8/2001 | Chan | ........................ | H04B 3/23 455/296 |
| 2005/0185603 A1* | 8/2005 | Huang | ................... | H04B 3/142 370/286 |
| 2011/0222446 A1* | 9/2011 | Nakatsuka | ............... | H04B 3/23 370/286 |

OTHER PUBLICATIONS

Jiang et al., "A DC-46Gb/s 2:1 Multiplexer and Source-Series Terminated Driver in 20nm CMOS Technology," IEEE Asian Solid-State Circuits Conference (A-SSCC), KaoHsiung, Taiwan, pp. 377-380, 2014.

* cited by examiner

*Primary Examiner* — Sophia Vlahos
(74) *Attorney, Agent, or Firm* — Paradice & Li LLP (57) ABSTRACT

This disclosure provides methods, devices, and systems for wireline communications. The present implementations more specifically relate to line driver circuits that support differential and single-ended signaling. In some aspects, a line driver circuit may include a pair of transmit (TX) digital-to-analog converters (DACs) and a "mock" TX DAC. When operating in a differential mode, the line driver circuit uses both TX DACs to drive a primary data signal and a complementary data signal onto a differential transmission line. When operating in a single-ended mode, the line driver circuit uses only one of the TX DACs to drive the primary data signal onto a single-ended transmission line and converts the complementary data signal to a mock echo signal via the mock TX DAC, where the mock echo signal mimics an echo of the complementary data signal. The mock echo signal may cancel echoes associated with the primary data signal.

20 Claims, 6 Drawing Sheets

LINE DRIVER CIRCUIT FOR FULL-DUPLEX TRANSCEIVERS WITH SUPPORT FOR DIFFERENTIAL AND SINGLE-ENDED SIGNALING

TECHNICAL FIELD

The present implementations relate generally to wireline communications, and specifically to line driver circuits for full-duplex transceivers with support for differential and single-ended signaling.

BACKGROUND OF RELATED ART

The Institute of Electrical and Electronics Engineers (IEEE) 802.3 family of standards define a set of wired communication protocols referred to as "Ethernet." Ethernet technologies form the backbone of many communication networks (such as local area networks (LANs), metropolitan area networks (MANs), and wide area networks (WANs), among other examples). Ethernet is also used in automotive applications, for example, to facilitate communications between sensors, controllers, and various other electronic components of an automobile. The IEEE 802.3ch amendment of the IEEE 802.3 standard defines various Ethernet protocols for automobiles. Such Ethernet protocols are specifically tailored for communications over twisted pair cables.

A twisted pair cable is a type of transmission line that supports data communications via differential signaling (also referred to as a "differential transmission line"). A twisted pair cable includes a pair of conductors each configured to carry a respective signal of a differential signal pair. A differential signal is formed by a pair of complementary signals that are equal in magnitude and opposite in polarity. For example, when a high voltage is driven onto one of the conductors of a twisted pair cable, a low voltage is concurrently driven onto the other conductor of the twisted pair cable. The difference in voltage between the conductors represents a digital value depending on which of the conductors is driven high and which of the conductors is driven low. Thus, Ethernet transceivers conforming to the IEEE 802.3ch amendment of the IEEE 802.3 standard must support differential signaling.

Although the IEEE 802.3ch amendment is designed for differential signaling over twisted pair cables, coaxial cables may be better suited for many automotive applications due to their lower cost and lighter weight (compared to twisted pair cables). A coaxial cable is a type of transmission line that supports data communications via single-ended signaling (also referred to as a "single-ended transmission line"). Unlike twisted pair cables, coaxial cables generally do not support differential signaling. Thus, new Ethernet transceiver designs are needed to support single-ended signaling in automotive environments that conform to the IEEE 802.3ch amendment.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method performed by a line driver circuit. The method includes steps of receiving a differential pair of complementary digital signals; converting a first digital signal of the differential pair to a first analog signal via a first digital-to-analog converter (DAC) coupled to a transmission line; converting a second digital signal of the differential pair to a second analog signal via a second DAC or a third DAC based on whether the line driver circuit is configured to transmit a differential signal or a single-ended signal on the transmission line; and suppressing an echo of the first analog signal based at least in part on the second analog signal.

Another innovative aspect of the subject matter of this disclosure can be implemented in a line driver circuit including a first DAC coupled to a transmission line, complementary transmit circuitry which includes a second DAC and a third DAC, and echo cancellation circuitry. The first DAC is configured to convert a first digital signal of a differential pair of complementary digital signals to a first analog signal. The complementary transmit circuitry is configured to convert a second digital signal of the differential pair to a second analog signal via the second DAC or the third DAC based on whether the line driver circuitry is configured to transmit a differential signal or a single-ended signal on the transmission line. The echo cancellation circuitry is configured to suppress an echo of the first analog signal based at least in part on the second analog signal.

Another innovative aspect of the subject matter of this disclosure can be implemented in a line driver circuit including a first DAC coupled to a single-ended transmission line, a second DAC operating at a lower power than the first DAC, and echo cancellation circuitry. The first DAC is configured to convert a first digital signal of a differential pair of complementary digital signals to a first analog signal. The second DAC is configured to convert a second digital signal of the differential pair to a second analog signal. The echo cancellation circuitry configured to suppress an echo of the first analog signal based at least in part on the second analog signal.

BRIEF DESCRIPTION OF THE DRAWINGS

The present implementations are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "computer system," "electronic system," and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, the Institute of Electrical and Electronics Engineers (IEEE) 802.3ch amendment of the IEEE 802.3 standard, which governs Ethernet communications in automobiles, is designed for differential signaling over twisted pair cables. As such, Ethernet transceivers conforming to the IEEE 802.3ch amendment often include differential line drivers to drive complementary data signals onto respective conductors of a twisted pair cable. However, coaxial cables may be better suited for many automotive applications due to their lower cost and lighter weight (compared to twisted pair cables). Unlike twisted pair cables, coaxial cables are designed for single-ended (rather than differential) signaling. Aspects of the present disclosure recognize that a differential line driver can drive just one of the complementary signals of a differential signal pair, as a single-ended signal, on a coaxial cable. However, additional circuitry is needed to ensure proper operation of the differential line driver in such configurations.

For example, in full-duplex communications, a portion of each outgoing data signal (also referred to as an "echo") leaks onto a data path for receiving incoming data signals. As a result, echoes of the outgoing data signals may mix or otherwise interfere with incoming data signals received from another line driver circuit. Echo cancellation is technique for canceling or suppressing echoes along the receive data path. In a differential line driver circuit, the complementary data signals of a differential signal pair produce complementary echoes that can be combined at the receiver to achieve echo cancellation or suppression. However, significant power is wasted driving complementary data signals at the outputs of the differential line driver circuit when only one of the signals is transmitted over a coaxial cable. Moreover, the unused output terminal of the differential line driver circuit must be externally terminated with a matched impedance to achieve accurate echo cancellation.

Various aspects relate generally to full-duplex transceivers for wireline communications, and more particularly, to differential line driver circuits that can support single-ended signaling without driving complementary data signals onto both output terminals. In some aspects, a line driver circuit may include a pair of transmit (TX) digital-to-analog converters (DACs) and one or more "mock" TX DACs that operate at a lower power than the TX DACs. When operating in a differential mode, the line driver circuit uses both TX DACs to drive a primary data signal and a complementary data signal onto respective conductors of a differential transmission line (such as a twisted pair cable). When operating in a single-ended mode, the line driver circuit uses only one of the TX DACs to drive the primary data signal onto a single-ended transmission line (such as a coaxial cable) and converts the complementary data signal to a mock echo signal via a mock TX DAC, where the mock echo signal mimics an echo of the complementary data signal in the analog domain. In some implementations, the line driver circuit may cancel echoes associated with the primary data signal based, at least in part on, the mock echo signal.

Particular implementations of the subject matter described in this disclosure can be implemented to realize one or more of the following potential advantages. By producing a mock echo signal mimicking an echo associated with a complementary data signal that would otherwise be transmitted on a twisted pair cable (such as in accordance with the IEEE 802.3ch amendment of the IEEE 802.3 standard), aspects of the present disclosure can significantly reduce the power consumption of a line driver circuit while still supporting echo cancellation for the primary data signal when operating in the single-ended mode. For example, the line driver circuit may generate the mock echo signal via a mock TX DAC in lieu of generating the complementary data signal via a TX DAC that operates at a substantially higher power. Because only one of the TX DACs is activated in the single-ended mode, the unused output terminal of the line driver circuit (coupled to the deactivated TX DAC) does not need to be externally terminated with a matched impedance. As a result, aspects of the present disclosure can also reduce the size and cost of full-duplex transceivers while maintaining support for differential and single-ended signaling.

Figure 1:
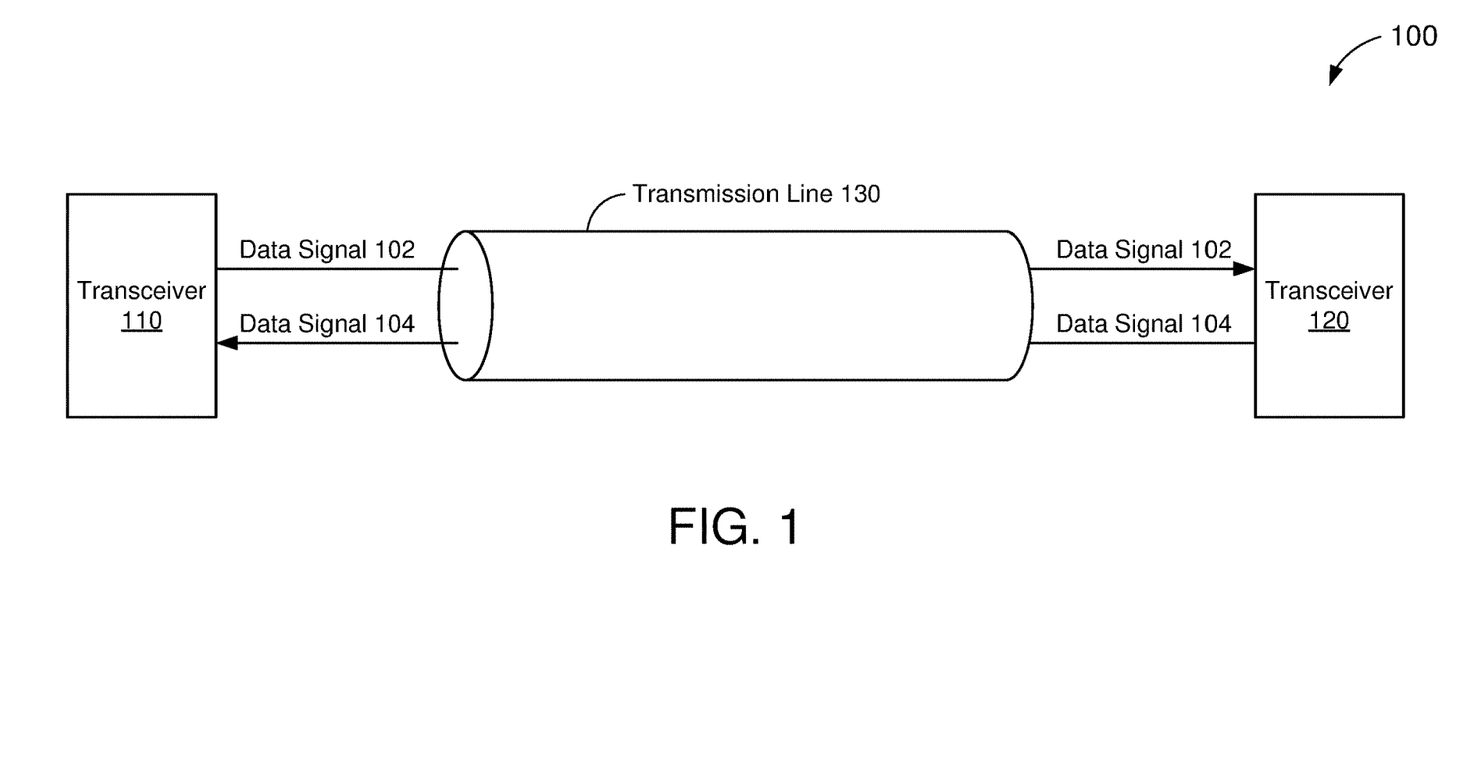
FIG. 1 shows a block diagram of an example wireline communication system.

FIG. 1 shows a block diagram of an example wireline communication system 100. The example communication system 100 includes a first transceiver 110 communicatively coupled to a second transceiver 120 via a transmission line 130. The transceivers 110 and 120 may support various wireline communication protocols. In some implementations, each of the transceivers 110 and 120 may be an Ethernet transceiver conforming to existing or future versions of the IEEE 802.3 Ethernet standard.

In some aspects, the transceivers 110 and 120 may be capable of full-duplex communications over the transmission line 130. In other words, the first transceiver 110 may transmit a first data signal 102, over the transmission line 130, to the second transceiver 120 while concurrently receiving a second data signal 104, over the transmission line 130, from the second transceiver 120. Similarly, the second transceiver 120 may transmit the second data signal 104, over the transmission line 130, to the first transceiver 110, while concurrently receiving the first data signal 102, over the transmission line 130, from the first transceiver 110.

In some implementations, the transmission line 130 may be a differential transmission line such as, for example, a twisted pair cable. A twisted pair cable includes a pair of conductors each configured to carry a respective signal of a differential signal pair. Thus, in such implementations, each of the data signals 102 and 104 may be represented by a differential pair of complementary signals. For example, when transmitting a data signal (such as any of the data signals 102 or 104) over a twisted pair cable, the transmitting device (such as any of the transceivers 110 or 120) may drive a high voltage on one of the conductors of the twisted pair cable and a low voltage, concurrently, on the other conductor of the twisted pair cable. The receiving device (such as any of the transceivers 110 or 120) detects a difference in voltages between the pair of conductors and converts the detected voltage differential to a digital value depending on which of the conductors is driven high and which of the conductors is driven low.

In some other implementations, the transmission line 130 may be a single-ended transmission line such as, for example, a coaxial cable. Unlike twisted pair cables, a coaxial cable has only one conductor suitable for carrying a data signal. Thus, in such implementations, each of the data signals 102 and 104 may be a single-ended data signal. For example, when transmitting a data signal (such as any of the data signals 102 or 104) over a coaxial cable, the transmitting device (such as any of the transceivers 110 or 120) may drive a high voltage on the conductor to represent a first digital value and may drive a low voltage on the conductor to represent a second digital value. The receiving device (such as any of the transceivers 110 or 120) detects the voltage on the conductor and converts the detected voltage to a digital value depending on whether the conductor is driven high or driven low.

Aspects of the present disclosure recognize that many existing versions of the IEEE 802.3 standard (such as the IEEE 802.3ch amendment) are designed for communications over twisted pair cable. As such, Ethernet transceivers conforming to the IEEE 802.3ch amendment of the IEEE 802.3 standard must have analog front ends (AFEs) that can at least receive or process differential signals in the digital domain. In some implementations (such as where the transmission line 130 is a twisted pair cable or other differential transmission line), each of the transceivers 110 and 120 may be configured to convert the differential data signals from the digital domain to differential data signals in the analog domain. In some other implementations (such as where the transmission line 130 is a coaxial cable or other single-ended transmission line), each of the transceivers 110 and 120 may be configured to convert the differential data signals from the digital domain to single-ended data signals in the analog domain.

Figure 2:
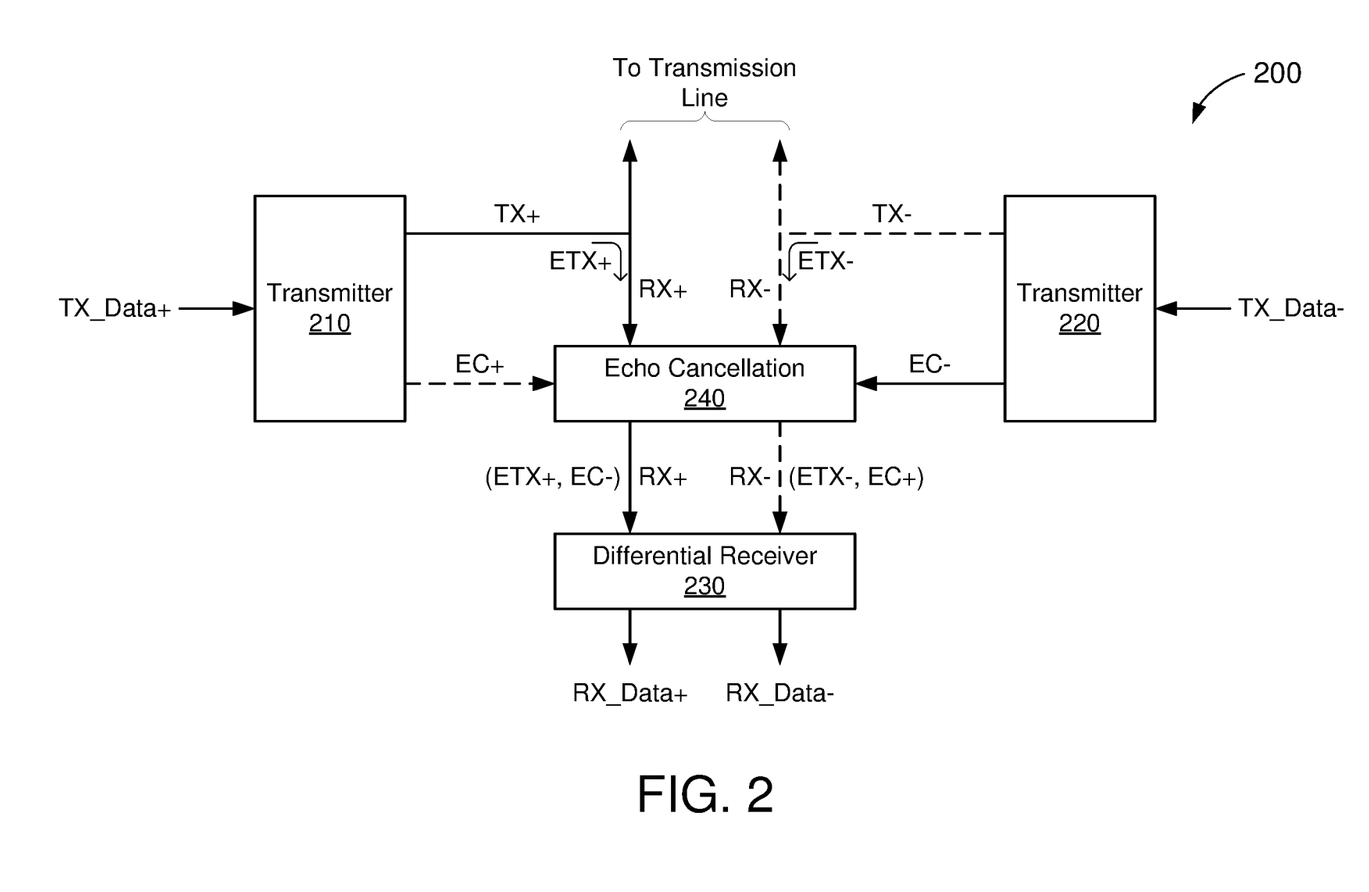
FIG. 2 shows a block diagram of an example transceiver for wireline communications, according to some implementations.

FIG. 2 shows a block diagram of an example transceiver 200 for wireline communications, according to some implementations. In some implementations, the transceiver 200 may be one example of any of the transceivers 110 or 120 of FIG. 1. More specifically, the transceiver 200 may support full-duplex communications over a transmission line (such as the transmission line 130 of FIG. 1). In some implementations, the transceiver 200 may conform to existing or future versions of the IEEE 802.3 Ethernet standard including, but not limited to, the IEEE 802.3ch amendment.

The transceiver 200 includes a pair of transmitters 210 and 220 and a differential receiver 230. The transmitters 210 and 220 are configured to transmit digital data over the transmission line. In some implementations, the transmitters 210 and 220 may receive the digital data as a series of differential values each having a primary data component TX_Data+ and a complementary data component TX_Data−. Such differential values are opposite in polarity so that the complementary data component TX_Data− has a logic-high value (such as "1") when the primary data component TX_Data+ has a logic-low value (such as "0") and the complementary data component TX_Data− has a logic-low value when the primary data component TX_Data+ has a logic-high value. In the example of FIG. 2, the first transmitter 210 is configured to receive the primary data component TX_Data+ and the second transmitter 220 is configured to receive the complementary data component TX_Data−.

In some aspects, the transceiver 200 may be configurable in a number of modes, including a differential mode and a single-ended mode. When the transceiver 200 is configured to operate in the differential mode, the transceiver 200 may transmit a differential pair of data signals TX+ and TX− (also referred to as "outgoing data signals") over the transmission line. More specifically, the first transmitter 210 may convert the primary data component TX_Data+ from the digital domain to a corresponding data signal TX+ in the analog domain (also referred to as a "primary data signal"), and the second transmitter 220 may convert the complementary data component TX_Data− from the digital domain to a corresponding data signal TX− in the analog domain (also referred to as a "complementary data signal"). In some implementations, the transmitters 210 and 220 may drive or otherwise transmit the pair of resulting data signals TX+ and TX−on a pair of conductors, respectively, of a differential transmission line (such as a twisted pair cable).

When operating in the differential mode, the transceiver 200 also may receive a differential pair of data signals RX+ and RX− (also referred to as "incoming data signals") over the transmission line. The differential pair of incoming data signals includes a primary data signal RX+ and a complementary data signal RX−. The differential receiver 230 may convert the incoming data signals RX+ and RX− from the analog domain to a series of differential values in the digital domain, where each differential value includes a primary data component RX_Data+ and a complementary data component RX_Data−. Such differential values may be opposite in polarity so that the complementary data component RX_Data− has a logic-high value (such as "1") when the primary data component RX_Data+ has a logic-low value (such as "0") and the complementary data component RX_Data− has a logic-low value when the primary data component RX_Data+ has a logic-high value.

During full-duplex communications, the transceiver 200 may receive the pair of incoming data signals RX+ and RX−on a pair of conductors, respectively, of the differential transmission line while concurrently transmitting the outgoing data signals TX+ and TX− on the same pair of conductors. For example, the transceiver 200 may transmit and receive the primary data signals TX+ and RX+ on a first conductor of the differential transmission line and may transmit and receive the complementary data signals TX− and RX− on a second conductor of the differential transmission line. As a result, portions of the outgoing data signals TX+ and TX− (also referred to as "echoes" ETX+ and ETX−, respectively) may leak onto the receive paths of the incoming data signals RX+ or RX−. The echoes ETX+ and ETX− mix or otherwise interfere with the incoming data signals RX+ and RX−, respectively, which can affect the accuracy of the differential values RX_Data+ and RX_Data− recovered by the differential receiver 230.

In some implementations, the transceiver 200 may further include an echo cancellation component 230 to cancel or suppress the echoes ETX+ and ETX− at the inputs to the differential receiver 230. In such implementations, the transmitters 210 and 220 also may convert the differential values TX_Data+ and TX_Data− to echo cancellation signals EC+ and EC−, respectively. As such, the echo cancellation signal EC+ tracks the polarity of the primary data signal TX+ and the echo cancellation signal EC−tracks the polarity of the complementary data signal TX−. Because the echoes ETX+ and ETX− have substantially less signal power than the data signals TX+ and TX−, the echo cancellation signals EC+ and EC− also may be produced at a substantially lower power than the data signals TX+ and TX−. In some implementations, the echo cancellation component 240 may add the echo cancellation signals EC− and EC+ to the receive data paths of the incoming data signals RX+ and RX−, respectively, to cancel or suppress the echoes ETX+ and ETX−.

Because the echo cancellation signals EC+ and EC−track the polarities of the data signals TX+ and TX−, respectively, the echo cancellation signal EC+ has a polarity opposite the echo ETX− and the echo cancellation signal EC− has a polarity opposite the echo ETX+. As a result, the echo cancellation signal EC+ may cancel or nullify the echo ETX− on the receive data path associated with the complementary data signal RX−when the magnitudes of the signals EC+ and ETX− are equal. Similarly, the echo cancellation signal EC− may cancel or nullify the echo ETX+ on the receive data path associated with the primary data signal RX+ when the magnitudes of the signals EC− and ETX+ are equal. However, because the first transmitter 210 does not share any hardware or circuitry with the second transmitter 220, the magnitudes of the echo cancellation signals EC+ and EC− may not match the magnitudes of the echoes ETX− and ETX+, respectively, at all instances of time. For example, the differences in hardware may result in mismatches between the phase or shape of the echo cancellation signal EC+ and the phase or shape of the echo ETX−, and also may result in mismatches between the phase or shape of the echo cancellation signal EC− and the phase or shape of the echo ETX+.

Aspects of the present disclosure recognize that the echo cancellation signals EC+ and EC− may still cancel or suppress the echoes ETX− and ETX+ at the inputs of the differential receiver 230 as a result of differential signaling between the receive data paths. For example, the pulse response (or amplitude at a given time t) of the differential echo ($P_{dm}(t)$) at the inputs of the differential receiver 230 can be expressed as a function of the pulse response of the echo ETX+ ($P_{ETX+}(t)$), the pulse response of the echo ETX− ($P_{ETX-}(t)$), the pulse response of the echo cancellation signal EC+ ($P_{EC+}(t)$), and the pulse response of the echo cancellation signal EC− ($P_{EC-}(t)$):

$$P_{dm}(t) = P_{ETX+}(t) - P_{ETX-}(t) - P_{EC+}(t) + P_{EC-}(t) \qquad (1)$$

With proper impedance matching, the echo cancellation component 240 can ensure that the pulse response of the echo cancellation signal EC+ matches the pulse response of the echo ETX+ ($P_{ETX+}(t) \approx P_{EC+}(t)$) and that the pulse response of the echo cancellation signal EC− matches pulse response of the echo ETX− ($P_{ETX-}(t) \approx P_{EC-}(t)$). As shown in Equation 1, when the echo cancellation signals EC+ and EC− are properly matched with the echoes ETX+ and ETX−, the differential pulse response is effectively nullified ($P_{dm}(t) \approx 0$).

When the transceiver 200 is configured to operate in the single-ended mode, the transceiver 200 may transmit a single-ended outgoing data signal TX+ over the transmission line. In some implementations, only the first transmitter 210 may be coupled to the transmission line. More specifically, the first transmitter 210 may convert the primary data component TX_Data+ from the digital domain to a data signal TX+ in the analog domain. In some implementations, the first transmitter 210 may drive or otherwise transmit the resulting data signal TX+ on a single-ended transmission line (such as a coaxial cable). When operating in the single-ended mode, the transceiver 200 also may receive a single-ended incoming data signal RX+ over the transmission line. The differential receiver 230 may convert the incoming data signal RX+ from the analog domain to a series of differential values in the digital domain, where each differential value includes a primary data component RX_Data+ and a complementary data component RX_Data−.

In some aspects, the second transmitter 220 may not produce a complementary data signal TX− when operating in the single-ended mode. In such aspects, the first transmitter 210 also may not produce the echo cancellation signal EC+. However, the second transmitter 220 may still convert the complementary data component TX_Data− to an echo cancellation signal EC− that can be used to cancel or suppress an echo ETX+ of the data signal TX+. For example, the pulse response (or amplitude at a given time t) of the single-ended echo ($P_{sm}(t)$) at the inputs of the differential receiver 230 can be expressed as a function of the pulse response of the echo ETX+ ($P_{ETX+}(t)$) and the pulse response of the echo cancellation signal EC− ($P_{EC-}(t)$):

$$P_{sm}(t) = P_{ETX+}(t) + P_{EC-}(t) \qquad (2)$$

When properly matched ($P_{ETX+}(t) \approx P_{EC-}(t)$), the echo cancellation signal EC− may cancel the echo ETX+. However, as described above, mismatches between the phase or shape of the echo cancellation signal EC− and the phase or shape of the echo ETX+ may prevent the magnitudes of the signals from cancelling at any given time.

Aspects of the present disclosure recognize that the phase and shape of the echo ETX+ may align more closely with the phase and shape of the echo cancellation signal EC+ because they can be produced using the same hardware of the transmitter 210. Similarly, the phase and shape of the echo cancellation signal EC− may align more closely with the phase and shape of the echo ETX− because they can be produced using the same hardware of the transmitter 220. Accordingly, the echo cancellation technique associated with Equation 1 is more robust to mismatches between the echo cancellation signal EC− and the echo ETX+ than the echo cancellation technique associated with Equation 2.

In some other aspects, the second transmitter 220 may convert the complementary data component TX_Data− to a complementary data signal TX−, which produces a corresponding echo ETX− along the receive data path opposite the incoming data signal RX+, when operating in the single-ended mode. In such aspects, the transmitters 210 and 220 also may convert the differential values TX_Data+ and TX_Data− to echo cancellation signals EC+ and EC−, respectively. As described above, the echo cancellation signal EC+ tracks the polarity of the primary data signal TX+ and the echo cancellation signal EC−tracks the polarity of the complementary data signal TX−. Thus, with proper impedance matching, the echo cancellation component 240 can ensure that the echo cancellation signals EC+ and EC− are properly matched with the echoes ETX+ and ETX−, thereby nullifying the differential pulse response at the inputs of the differential receiver 230 (such as according to Equation 1).

Because only the first transmitter 210 is coupled to the transmission line, the complementary data signal TX− is not transmitted by the transceiver 200 when operating in the single-ended mode. However, the transmit data path carrying the complementary data signal TX-must be externally terminated with a matched impedance (not shown for simplicity) to ensure that the data signal TX− is complementary to the data signal TX+. Externally terminating the transmit data path requires additional circuitry which can add to the cost and size of transceiver 200. Moreover, a significant amount of power in the complementary data signal TX− is lost via external termination in the single-ended mode. Aspects of the present disclosure recognize that the size, cost, and efficiency of the transceiver 200 can be improved, without sacrificing echo cancellation performance, by generating a "mock" echo signal that mimics the echo ETX− that would otherwise result from driving the complementary data signal TX− on a respective transmit data path.

Figure 3:
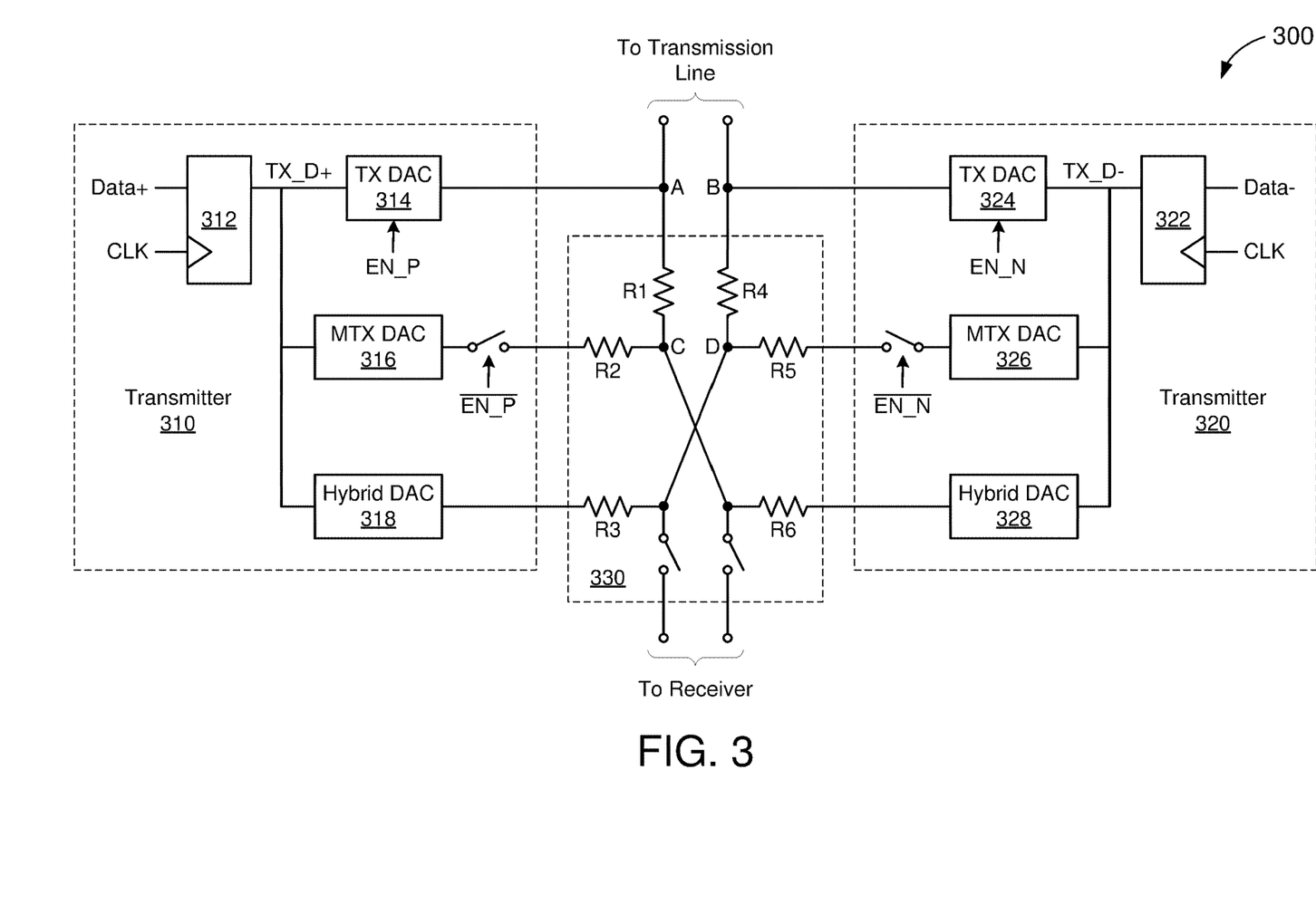
FIG. 3 shows an example line driver circuit for a full-duplex transceiver, according to some implementations.

FIG. 3 shows an example line driver circuit 300 for a full-duplex transceiver, according to some implementations. In some implementations, the transceiver may be one example of any of the transceivers 110 or 120 of FIG. 1. More specifically, the transceiver may support full-duplex communications over a transmission line (such as the transmission line 130 of FIG. 1). In some implementations, the transceiver may conform to existing or future versions of the IEEE 802.3 Ethernet standard including, but not limited to, the IEEE 802.3ch amendment.

The line driver circuit 300 is configured to drive a single voltage or amplitude level associated with a pulse amplitude modulation (PAM) signal. In actual implementations, the transceiver may include multiple line driver circuits. For example, a transceiver that supports PAM-4 signaling may include 6 line driver circuits that are similar, if not identical, to the line driver circuit 300. In some implementations, the line driver circuit 300 may be configured to operate in a number of modes, including a differential mode and a single-ended mode. When configured to operate in the differential mode, the line driver circuit 300 may transmit a differential data signal over the transmission line (such as a twisted pair cable). When configured to operate in the single-ended mode, the line driver circuit 300 may transmit a single-ended data signal over the transmission line (such as a coaxial cable).

The line driver circuit 300 includes a pair of transmitters 310 and 320 and an echo cancellation circuit 330. The transmitters 310 and 320 are configured to transmit digital data over the transmission line. In some implementations, the transmitters 310 and 320 may receive the digital data as a series of differential values each having a primary data component Data+ and a complementary data component Data-. Such differential values are opposite in polarity so that the complementary data component Data− has a logic-high value (such as "1") when the primary data component Data+ has a logic-low value (such as "0") and the complementary data component Data− has a logic-low value when the primary data component Data+ has a logic-high value. In the example of FIG. 3, the first transmitter 310 is configured to receive the primary data component Data+ and the second transmitter 320 is configured to receive the complementary data component Data-.

The first transmitter 310 includes a flip-flop 312, a transmit (TX) digital-to-analog converter (DAC) 314, a mock transmit (MTX) DAC 316, and a hybrid DAC 318. The flip-flop 312 samples the primary data component Data+ in response to a clock signal CLK, which produces a time-varying digital data signal TX_D+. The digital data signal TX_D+ is provided as inputs to the DACs 314-318. In some implementations, the TX DAC 314 may be activated (or deactivated) in response to an enable signal EN_P. When activated, the TX DAC 314 converts the digital data signal TX_D+ to an analog signal suitable for transmission over the transmission line (such as the primary data signal TX+ of FIG. 2). As shown in FIG. 3, the output of the TX DAC 314 is coupled to a first output terminal of the transceiver (at node "A"). As described with reference to FIG. 2, an echo of the outgoing data signal may leak onto a receive data path of the line driver circuit 300 coupled to node A.

The hybrid DAC 318 is configured to convert the digital data signal TX_D+ to an analog signal that can be used to cancel or suppress echoes in the line driver circuit 300 (such as the echo cancellation signal EC+ of FIG. 2). As shown in FIG. 3, the output of the hybrid DAC 318 is coupled to the echo cancellation circuit 330 (at node "D"). In some implementations, the MTX DAC 316 may convert the digital data signal TX_D+ to an analog signal that mimics the echo of the outgoing data signal produced by the TX DAC 314 (also referred to as a "mock echo signal"). As described with reference to FIG. 2, the mock echo signal may support differential echo cancellation when the line driver circuit 300 is configured to operate in the single-ended mode. Thus, as shown in FIG. 3, the output of the MTX DAC 316 is switchably coupled to the echo cancellation circuit 330 (at node C) based on a complementary enable signal $\overline{EN\_P}$. In other words, the MTX DAC 316 may provide the mock echo signal to the echo cancellation circuit 330 only when the TX DAC 314 is deactivated.

The second transmitter 320 includes a flip-flop 322, a TX DAC 324, an MTX DAC 326, and a hybrid DAC 328. The flip-flop 322 samples the complementary data component Data– in response to a clock signal CLK, which produces a time-varying digital data signal TX_D–. The digital data signal TX_D– is provided as inputs to the DACs 324-328. In some implementations, the TX DAC 324 may be activated (or deactivated) in response to an enable signal EN_N. When activated, the TX DAC 324 converts the digital data signal TX_D– to an analog signal suitable for transmission over the transmission line (such as the complementary data signal TX– of FIG. 2). As shown in FIG. 3, the output of the TX DAC 324 is coupled to a second output terminal of the transceiver (at node "B"). As described with reference to FIG. 2, an echo of the outgoing data signal may leak onto a receive data path of the line driver circuit 300 coupled to node B.

The hybrid DAC 328 is configured to convert the digital data signal TX_D– to an analog signal that can be used to cancel or suppress echoes in the line driver circuit 300 (such as the echo cancellation signal EC– of FIG. 2). As shown in FIG. 3, the output of the hybrid DAC 328 is coupled to the echo cancellation circuit 330 (at node "C"). In some implementations, the MTX DAC 326 may convert the digital data signal TX_D– to an analog signal that mimics the echo of the outgoing data signal produced by the TX DAC 324 (such as a mock echo signal). As described with reference to FIG. 2, the mock echo signal may support differential echo cancellation when the line driver circuit 300 is configured to operate in the single-ended mode. Thus, as shown in FIG. 3, the output of the MTX DAC 326 is switchably coupled to the echo cancellation circuit 330 (at node D) based on a complementary enable signal $\overline{EN\_N}$. In other words, the MTX DAC 326 may provide the mock echo signal to the echo cancellation circuit 330 only when the TX DAC 324 is deactivated.

Each of the DACs 314-318 and 324-328 may be implemented as a source-series terminated (SST) driver including a tri-state inverter and a resistor coupled in series to the output of the inverter (not shown for simplicity). In some implementations, capacitors (not shown for simplicity) may be coupled to the outputs of the DACs 314-318 and 324-328 to perform low-pass filtering on the transmit and receive data paths. Because the TX DACs 314 and 324 are configured to drive data signals over external loads with fixed impedances, whereas the MTX DACs 316 and 326 and the hybrid DACs 318 and 328 are used to drive mock echo signals over internal loads that can be configured to provide significantly higher resistances, each of the MTX DACs 316 and 326 and hybrid DACs 318 and 328 may be configured to operate at a significantly lower power than any of the TX DACs 314 and 324. In some implementations, each of the MTX DACs 316 and 326 and hybrid DACs 318 and 328 may operate at $\frac{1}{10}^{th}$ the power of the TX DACs 314 and 324. For example, assuming the DACs 314-318 and 324-328 are constructed using the same unit driver slice, each of the TX DACs 314 and 324 may include 10 driver slices whereas each of the MTX DACs 316 and 326 and hybrid DACs 318 and 328 may include only a single driver slice.

The echo cancellation circuit 330 is configured to combine the analog signals on the receive data paths to cancel or suppress echoes of any outgoing data signals. In some implementations, the echo cancellation circuit 330 may include a number of resistors R1-R6 that can be used to tune the gains of the DACs 314-318 and 324-328 relative to the receiver. As shown in FIG. 3, the resistors R1 couples the output of the TX DAC 314 to node C, the resistor R2 couples the output of the MTX DAC 316 to node C, the resistor R3 couples the output of the hybrid DAC 318 to node D, the resistor R4 couples the output of the TX DAC 324 to node D, the resistor R5 couples the output of the MTX DAC 326 to node D, and the resistor R6 couples the output of the hybrid DAC 328 to node C. With proper impedance matching, the resistances of the resistors R1-R6 can be configured so that the gains of the DACs 314-318 and 324-328 at nodes C and D are equal and opposite in polarity, thereby canceling any echoes along the receive data paths. In some implementations, the echo cancellation circuit 330 may switchably couple nodes C and D to the receive data paths associated with the receiver for greater gain control.

Figure 4A:
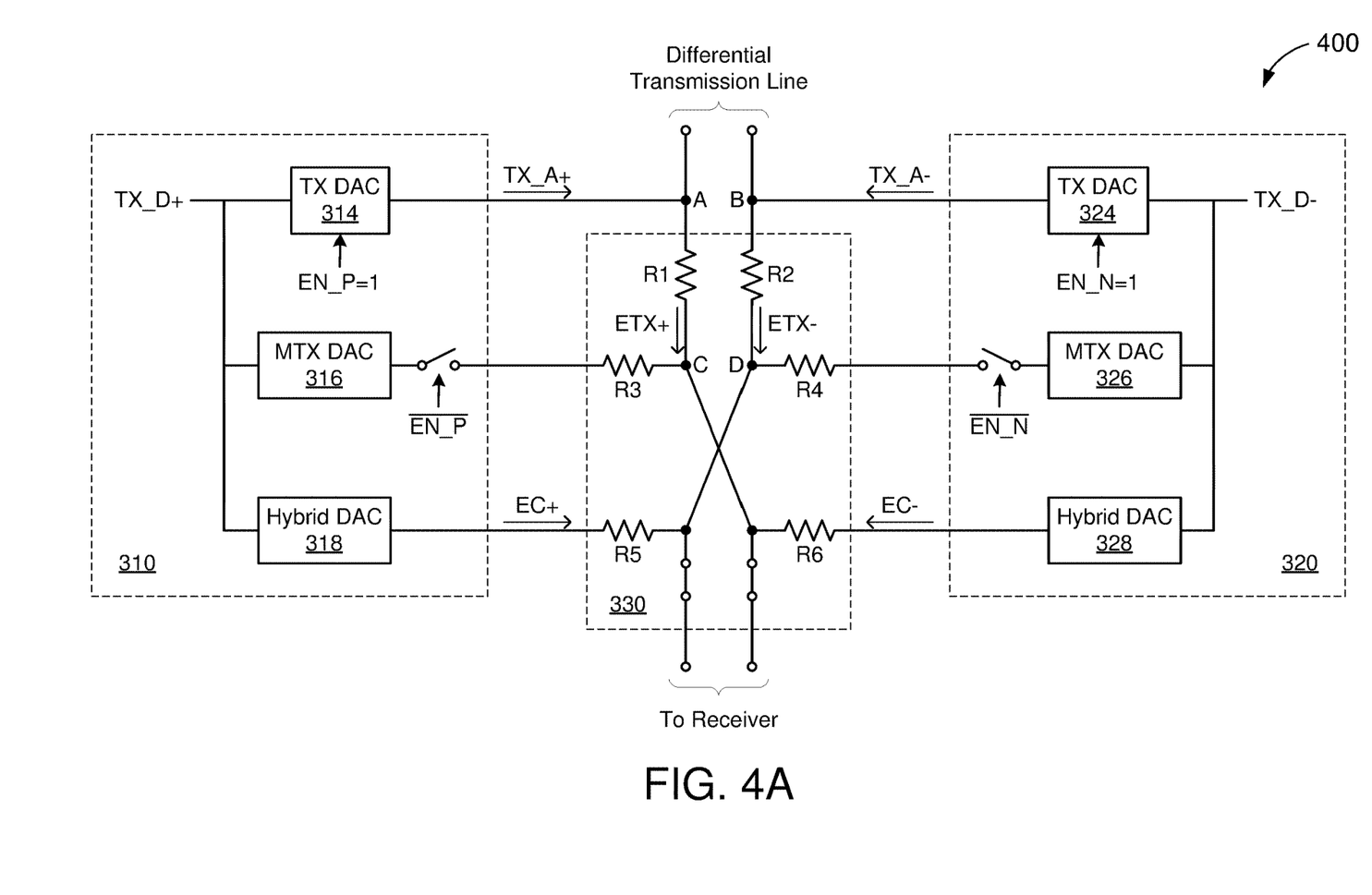
FIG. 4A shows an example configuration of the line driver circuit depicted in FIG. 3.

FIG. 4A shows an example configuration 400 of the line driver circuit 300 depicted in FIG. 3. In the example of FIG. 4A, the line driver circuit 300 is configured to operate in the differential mode by driving the differential pair of data signals TX_D+ and TX_D– onto a differential transmission line (for simplicity, the flip-flops 312 and 322 are not shown in FIG. 4A). For example, the output terminals of the line driver circuit 300 (at nodes A and B) may be coupled to respective conductors of the transmission line. In this configuration, both of the TX DACs 314 and 324 are activated (EN_P=EN_N=1) and the MTX DACs 316 and 326 are decoupled from the echo cancellation circuit 330.

In the first transmitter 310, the TX DAC 314 converts the digital data signal TX_D+ to an analog data signal TX_A+ by driving a time-varying voltage onto node A and the hybrid DAC 318 converts the digital data signal TX_D+ to an echo cancellation signal EC+ by driving a time-varying voltage onto node D. An echo ETX+ of the analog data signal TX_A+ may leak across the resistor R1 due to a difference in voltage potential between nodes A and C. In the second transmitter 320, the TX DAC 324 converts the digital data signal TX_D– to an analog data signal TX_A– by driving a time-varying voltage onto node B and the hybrid DAC 328 converts the digital data signal TX_D− to an echo cancellation signal EC− by driving a time-varying voltage onto node C. An echo ETX− of the analog data signal TX_A− may leak across the resistor R2 due to a difference in voltage potential between nodes B and D.

The echo cancellation circuit 330 combines each of the echoes ETX+ and ETX− with the echo cancellation signals EC− and EC+, respectively, so that the echoes are effectively nullified across the differential inputs of the receiver. For example, the resistances of the resistors R1, R2, R5, and R6 may be tuned so that the pulse response of the echo cancellation signal EC+ matches the pulse response of the echo ETX+ ($P_{ETX+}(t) \approx P_{EC+}(t)$) and the pulse response of the echo cancellation signal EC-matches pulse response of the echo ETX− ($P_{ETX−}(t) \approx P_{EC−}(t)$). As shown in Equation 1, when the echo cancellation signals EC+ and EC− are properly matched with the echoes ETX+ and ETX−, the differential pulse response is effectively nullified ($P_{dm}(t) \approx 0$).

Figure 4B:
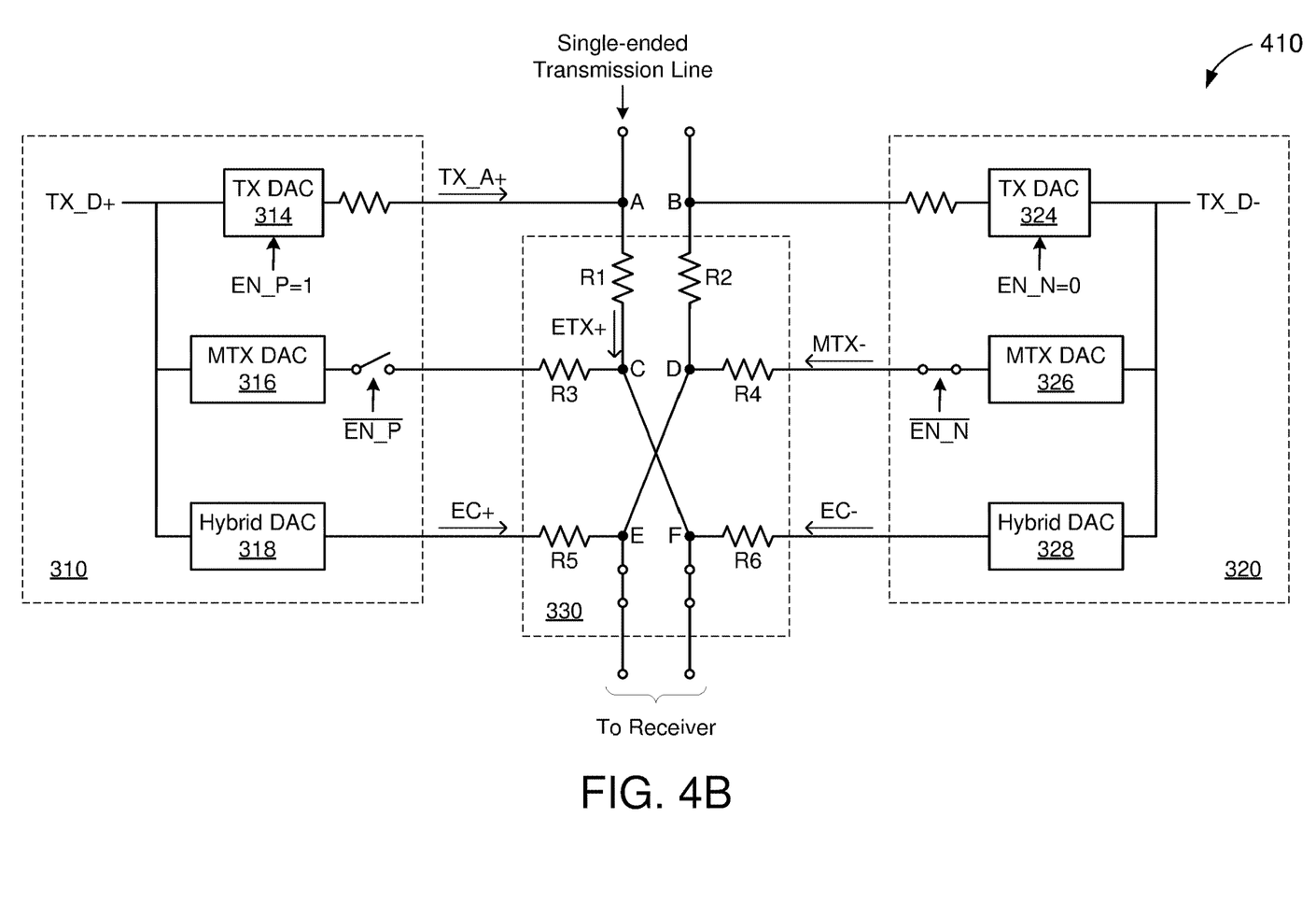
FIG. 4B shows another example configuration of the line driver circuit depicted in FIG. 3.

FIG. 4B shows another example configuration 410 of the line driver circuit 300 depicted in FIG. 3. In the example of FIG. 4B, the line driver circuit 300 is configured to operate in the single-ended mode by driving the differential pair of data signals TX_D+ and TX_D− onto a single-ended transmission line (for simplicity, the flip-flops 312 and 322 are not shown in FIG. 4B). For example, only one of the output terminals of the line driver circuit 300 (such as at node A) may be coupled to the transmission line. In this configuration, the TX DAC 314 is activated while the TX DAC 324 is deactivated (EN_P=1 and EN_N=0), and the MTX DAC 326 is coupled to the echo cancellation circuit 330 while the MTX DAC 316 is decoupled from the echo cancellation circuit 330.

In the first transmitter 310, the TX DAC 314 converts the digital data signal TX_D+ to an analog data signal TX_A+ by driving a time-varying voltage onto node A, and the hybrid DAC 318 converts the digital data signal TX_D+ to an echo cancellation signal EC+ by driving a time-varying voltage onto node D. An echo ETX+ of the analog data signal TX_A+ may leak across the resistor R1 due to a difference in voltage potential between nodes A and C. In the second transmitter 320, the MTX DAC 326 converts the digital data signal TX_D− to a mock echo signal MTX− by driving a time-varying voltage onto node D and the hybrid DAC 328 converts the digital data signal TX_D− to an echo cancellation signal EC− by driving a time-varying voltage onto node C. Because the TX DAC 324 is inactive or otherwise non-operational in the single-ended mode, the other output terminal of the line driver circuit 300 (such as at node B) does not need to be externally terminated with a matched impedance. In such implementations, the presence or absence of an external termination does not affect the matching between the gain of the hybrid DAC 318 and the gain of MTX DAC 326, at node D, when R4 and R5 are configured properly.

The echo cancellation circuit 330 combines the echo ETX+ and mock echo signal MTX− with the echo cancellation signals EC− and EC+, respectively, so that the echoes are effectively nullified across the differential inputs of the receiver. For example, the resistances of the resistors R1, R4, R5, and R6 may be turned so that the pulse response of the echo cancellation signal EC+ matches the pulse response of the echo ETX+ ($P_{ETX+}(t) \approx P_{EC+}(t)$) and the pulse response of the echo cancellation signal EC-matches the pulse response of the mock echo signal MTX− ($P_{MTX−}(t) \approx P_{EC−}(t)$). The pulse response of the differential echo ($P_{sm}(t)$) at the inputs of the receiver can be expressed as a function of $P_{ETX+}(t)$, $P_{MTX−}(t)$, $P_{EC+}(t)$, and $P_{EC−}(t)$:

$$P_{sm}(t) = P_{ETX+}(t) - P_{MTX−}(t) - P_{EC+}(t) + P_{EC−}(t) \quad (3)$$

As shown in Equation 3, when the echo cancellation signals EC+ and EC− are properly matched with the echo ETX+ and mock echo signal MTX−, the differential pulse response is effectively nullified ($P_{sm}(t) \approx 0$).

Figure 5:
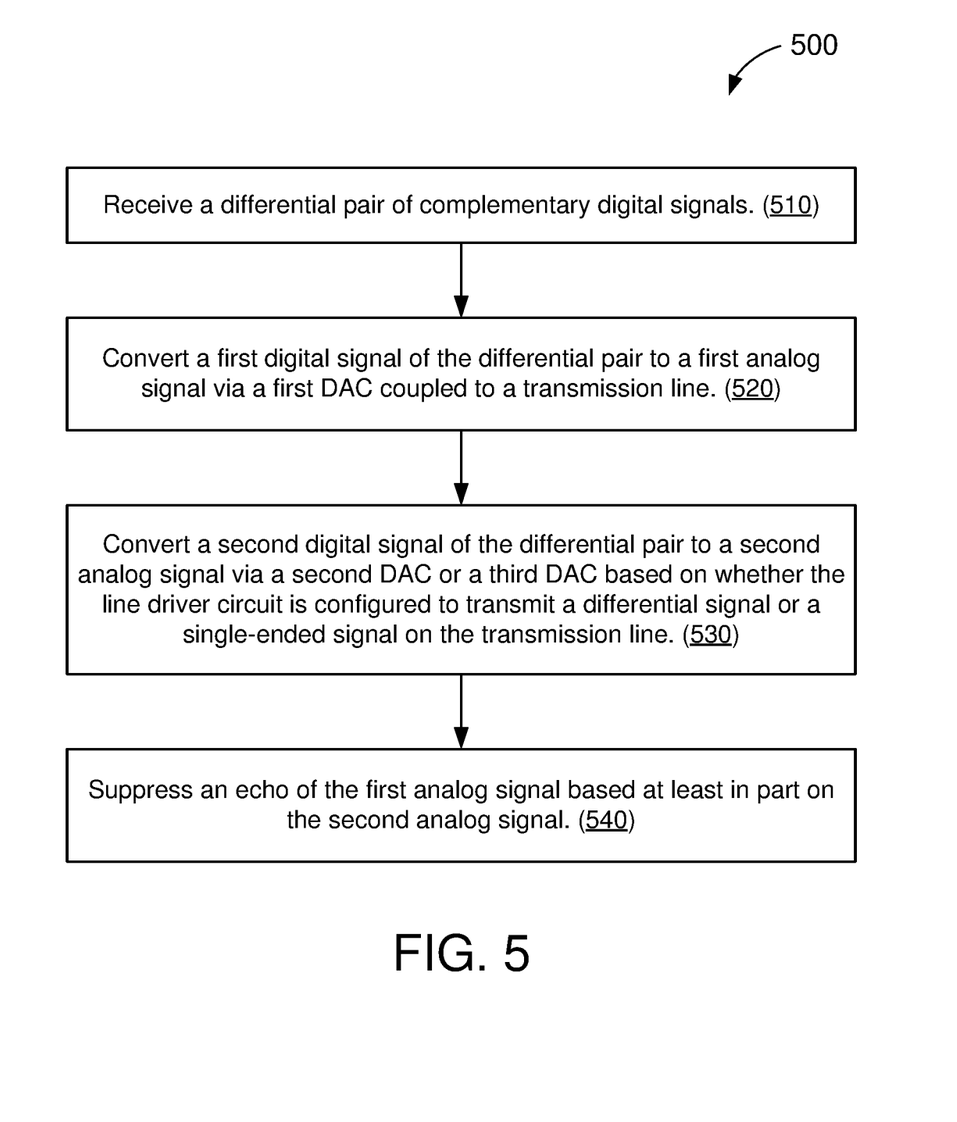
FIG. 5 shows an illustrative flowchart depicting an example operation performed by a line driver circuit, according to some implementations.

FIG. 5 shows an illustrative flowchart depicting an example operation 500 performed by a line driver circuit, according to some implementations. In some implementations, the line driver circuit may be one example of the line driver circuit 300 of FIG. 3.

The line driver circuit receives a differential pair of complementary digital signals (510). The line driver circuit converts a first digital signal of the differential pair to a first analog signal via a first DAC coupled to a transmission line (520). The line driver circuit also converts a second digital signal of the differential pair to a second analog signal via a second DAC or a third DAC based on whether the line driver circuit is configured to transmit a differential signal or a single-ended signal on the transmission line (520). The line driver circuit further suppresses an echo of the first analog signal based at least in part on the second analog signal (530).

In some implementations, the transmission line may comprise a twisted pair cable having a first conductor coupled to the first DAC and a second conductor coupled to the second DAC. In such implementations, the second digital signal may be converted to the second analog signal via the second DAC based on the line driver circuit being configured to transmit a differential signal over the twisted pair cable.

In some other implementations, the transmission line may comprise a coaxial cable that is not coupled to any of the second or third DACs. In such implementations, the second digital signal may be converted to the second analog signal via the third DAC based on the line driver circuit being configured to transmit a single-ended signal over the coaxial cable. In some implementations, the third DAC may be configured to operate at a lower power than the second DAC.

In some implementations, the suppressing of the echo may include converting the first digital signal to a third analog signal via a fourth DAC; converting the second digital signal to a fourth analog signal via a fifth DAC; combining the echo with the fourth analog signal at a first input of a differential receiver; and combining the second analog signal with the third analog signal at a second input of the differential receiver.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method performed by a line driver circuit, comprising:
   receiving a differential pair of complementary digital signals;
   converting a first digital signal of the differential pair to a first analog signal via a first digital-to-analog converter (DAC) coupled to a transmission line;
   converting a second digital signal of the differential pair to a second analog signal via a second DAC or a third DAC based on whether the line driver circuit is configured to transmit a differential signal or a single-ended signal on the transmission line; and
   suppressing an echo of the first analog signal based at least in part on the second analog signal.

2. The method of claim 1, wherein the transmission line comprises a twisted pair cable having a first conductor coupled to the first DAC and a second conductor coupled to the second DAC.

3. The method of claim 2, wherein the second digital signal is converted to the second analog signal via the second DAC based on the line driver circuit being configured to transmit a differential signal over the twisted pair cable.

4. The method of claim 1, wherein the transmission line comprises a coaxial cable that is not coupled to any of the second or third DACs.

5. The method of claim 4, wherein the third DAC is configured to operate at a lower power than the second DAC.

6. The method of claim 5, wherein the second digital signal is converted to the second analog signal via the third DAC based on the line driver circuit being configured to transmit a single-ended signal over the coaxial cable.

7. The method of claim 6, wherein the suppressing of the echo comprises:
   converting the first digital signal to a third analog signal via a fourth DAC;
   converting the second digital signal to a fourth analog signal via a fifth DAC;
   combining the echo with the fourth analog signal at a first input of a differential receiver; and
   combining the second analog signal with the third analog signal at a second input of the differential receiver.

8. A line driver circuit comprising:
   a first digital-to-analog converter (DAC) coupled to a transmission line and configured to convert a first digital signal of a differential pair of complementary digital signals to a first analog signal;
   complementary transmit circuitry, including a second DAC and a third DAC, configured to convert a second digital signal of the differential pair to a second analog signal via the second DAC or the third DAC based on whether the line driver circuit is configured to transmit a differential signal or a single-ended signal on the transmission line; and
   echo cancellation circuitry configured to suppress an echo of the first analog signal based at least in part on the second analog signal.

9. The line driver circuit of claim 8, wherein the transmission line comprises a twisted pair cable having a first conductor coupled to the first DAC and a second conductor coupled to the second DAC.

10. The line driver circuit of claim 9, wherein the complementary transmit circuitry converts the second digital signal to the second analog signal via the second DAC based on the line driver circuit being configured to transmit a differential signal over the twisted pair cable.

11. The line driver circuit of claim 8, wherein the transmission line comprises a coaxial cable that is not coupled to any of the second or third DACs.

12. The line driver circuit of claim 11, wherein the third DAC is configured to operate at a lower power than the second DAC.

13. The line driver circuit of claim 12, wherein the complementary transmit circuitry converts the second digital signal to the second analog signal via the third DAC based on the line driver circuit being configured to transmit a single-ended signal over the coaxial cable.

14. The line driver circuit of claim 13, further comprising:
   a fourth DAC configured to convert the first digital signal to a third analog signal; and
   a fifth DAC configured to convert the second digital signal to a fourth analog signal.

15. The line driver circuit of claim 14, wherein the echo cancellation circuitry is further configured to suppress the echo of the first analog signal based on the third analog signal and the fourth analog signal.

16. The line driver circuit of claim 15, wherein the suppressing of the echo comprises:
   combining the echo with the fourth analog signal at a first input of a differential receiver; and
   combining the second analog signal with the third analog signal at a second input of the differential receiver.

17. A line driver circuit comprising:
   a first digital-to-analog converter (DAC) coupled to a single-ended transmission line and configured to convert a first digital signal of a differential pair of complementary digital signals to a first analog signal;

a second DAC configured to convert a second digital signal of the differential pair to a second analog signal, the second DAC operating at a lower power than the first DAC; and echo cancellation circuitry configured to suppress an echo of the first analog signal based at least in part on the second analog signal.

18. The line driver circuit of claim 17, further comprising:

a third DAC configured to convert the first digital signal to a third analog signal; and a fourth DAC configured to convert the second digital signal to fourth analog signal.

19. The line driver circuit of claim 18, wherein the echo cancellation circuitry is further configured to suppress the echo of the first analog signal based on the third analog signal and the fourth analog signal.

20. The line driver circuit of claim 19, wherein the echo cancellation circuitry is further configured to:

combine the echo with the fourth analog signal at a first input of a differential receiver; and combine the second analog signal with the third analog signal at a second input of the differential receiver.

* * * * *